(12) United States Patent
Boily (10) Patent No.: US 12,351,244 B2
(45) Date of Patent: Jul. 8, 2025

(54) SHOCK DEFLECTING TRAILER WALL PANEL AND BEAM ASSEMBLY AND TRUCK TRAILER USING SAME

(71) Applicant: MANAC INC., Saint-Georges (CA)

(72) Inventor: Christian Boily, Beauceville (CA)

(73) Assignee: MANAC INC., Saint-Georges (CA)

( * ) Notice: Subject to any disclaimer, the term of this patent is extended or adjusted under 35 U.S.C. 154(b) by 388 days.

(21) Appl. No.: 18/074,426

(22) Filed: Dec. 2, 2022

(65) Prior Publication Data

US 2023/0174169 A1     Jun. 8, 2023

Related U.S. Application Data (60) Provisional application No. 63/285,646, filed on Dec. 3, 2021.

(30) Foreign Application Priority Data

Dec. 3, 2021 (CA) ................................ CA 3141048

(51) Int. Cl.
    *B62D 33/04*        (2006.01)
    *B62D 21/20*        (2006.01)

(52) U.S. Cl.
    CPC .......... *B62D 33/046* (2013.01); *B62D 21/20* (2013.01)

(58) Field of Classification Search
    CPC ..... B62D 33/04; B62D 33/044; B62D 33/046
    USPC ............................ 296/186.1, 193.05, 191, 29
    See application file for complete search history.

(56) References Cited

U.S. PATENT DOCUMENTS

| | | | |
|---|---|---|---|
| 2,052,535 A | 8/1935 | Sherman | |
| 2,812,192 A | 11/1957 | Cole | |
| 4,224,775 A * | 9/1980 | Heckelsberg | ........... E04D 3/368 |
| | | | 52/630 |
| 4,363,590 A | 12/1982 | Crate | |
| 5,205,587 A | 4/1993 | Orr | |
| 5,507,514 A | 4/1996 | Jacques | |
| 7,097,232 B2 | 8/2006 | Beaudry et al. | |
| 7,559,736 B1 | 7/2009 | Mohan | |
| 7,618,227 B2 | 11/2009 | Smith | |

(Continued)

FOREIGN PATENT DOCUMENTS

| | | |
|---|---|---|
| CA | 2728040 | 12/2009 |
| CA | 3141048 A1 | 6/2023 |

(Continued)

OTHER PUBLICATIONS

English Abstract of WO2021156780A1, "Underframe for Platform Trucks, and Platform Truck", published on Aug. 12, 2021.

(Continued)

*Primary Examiner* — Dennis H Pedder
(74) *Attorney, Agent, or Firm* — SMART & BIGGAR LP (57) ABSTRACT

Provided herein is a shock deflecting wall panel and beam assembly, beam, and truck trailer using the same. The trailer wall panel assembly comprises at least one wall panel and at least one beam, wherein the at least one beam is configured to be received and retained in the at least one wall panel. The beam comprises at least one edge, a first beam corner, a second beam corner and a third beam corner, a first arm, an intermediate section, and a second arm, wherein the first and second arms are substantially parallel to one another, and the beam is configured to be substantially vertically extending.

20 Claims, 5 Drawing Sheets

(56) References Cited

U.S. PATENT DOCUMENTS

| | | |
|---|---|---|
| 7,926,848 B2 | 4/2011 | Sherbeck et al. |
| 8,075,062 B2 | 12/2011 | Hicks |
| 8,157,499 B1 | 4/2012 | Jones |
| 8,167,061 B2 | 5/2012 | Scheuerman et al. |
| 8,328,140 B2 | 12/2012 | Nordstrom |
| D695,152 S | 12/2013 | Duggleby et al. |
| 8,925,951 B2 | 1/2015 | Bartlett |
| 9,266,676 B2 | 2/2016 | Pfeiffer et al. |
| 9,718,390 B1 | 8/2017 | Hadley et al. |
| 9,776,668 B2 | 10/2017 | Isaksson |
| 9,919,798 B2 | 3/2018 | Haertel et al. |
| 10,183,606 B2 | 1/2019 | Schomaker et al. |
| 10,239,436 B2 | 3/2019 | Oren |
| 10,239,690 B2 | 3/2019 | Battles et al. |
| 10,322,660 B1 | 6/2019 | Dermeche |
| 10,449,886 B2 | 10/2019 | Richardson |
| 10,688,901 B2 | 6/2020 | Zahr et al. |
| 10,787,108 B2 | 9/2020 | Vollmering |
| 11,089,730 B2 | 8/2021 | Canela Sacanell et al. |
| 11,117,630 B2 | 9/2021 | Plowman |
| 11,208,023 B2 | 12/2021 | Marble |
| 11,312,284 B2 | 4/2022 | Sollenlid et al. |
| 11,351,867 B2 | 6/2022 | Schutt et al. |
| 11,945,506 B2 | 4/2024 | Veilleux et al. |
| 2004/0070190 A1 | 4/2004 | Ridge et al. |
| 2007/0241587 A1 | 10/2007 | Fleming |
| 2009/0256399 A1 | 10/2009 | Sherbeck et al. |
| 2010/0308639 A1 | 12/2010 | Cushman |
| 2015/0183361 A1 | 7/2015 | Bacon |
| 2020/0039415 A1 | 2/2020 | Bacon |
| 2020/0039557 A1 | 2/2020 | Burch, V et al. |
| 2021/0178956 A1 | 6/2021 | Richardson |
| 2021/0276636 A1 | 9/2021 | Griffee et al. |
| 2021/0387558 A1 | 12/2021 | Carlson et al. |
| 2022/0135137 A1 | 5/2022 | Veilleux et al. |
| 2022/0162941 A1 | 5/2022 | Morrison |

FOREIGN PATENT DOCUMENTS

| | | |
|---|---|---|
| CN | 205930900 U | 2/2017 |
| CN | 304656891 | 6/2018 |
| CN | 208585155 | 3/2019 |
| CN | 113320608 | 8/2021 |
| DE | 202020101117 U1 | 3/2020 |
| EP | 3708453 A1 | 9/2020 |
| WO | 2021156780 | 8/2021 |
| WO | 2021156780 A1 | 8/2021 |
| WO | 2022015170 | 1/2022 |

OTHER PUBLICATIONS

Capral Limited, "Aluminum Products Catalogue", [online][retrieved on Sep. 26, 2023] retrieved from https://www.capral.com.au/wordpress/wp-content/uploads/Capral-Truck-Utility-Trays.pdf, Oct. 2020.

Capral Limited, "Aluminum Transport Sections", [online][retrieved on Sep. 27, 2023] retrieved from https://www.capral.com.au/wordpress/wp-content/uploads/2019/09/Capral-Alum-Products_Catalogue.pdf, Jul. 2021.

English Translation—Machine Translation of CN113320608B, "Improved semitrailer frame", published on Aug. 31, 2021.

English Translation—Machine Translation of CN208585155U, "Container semitrailer of easily unloading", published on Mar. 8, 2019.

English Translation—Machine Generated of CN205930900U, "High Load-Bearing Integrated Lightweight Frame", published on Feb. 8, 2017.

English Translation—Machine Generated of DE202020101117U1, "Underframe for Platform Trucks, and Platform Trucks", published on Mar. 17, 2020.

English Translation—Machine Generated of EP3708453A1, "Subframe for Vehicles and Vehicle", published on Sep. 16, 2020.

English Translation—Machine Generated of WO2021156780A1, "Underframe for Platform Trucks, and Platform Trucks", published on Aug. 12, 2021.

Kaufman Trailers, "14,000 to 18,000 GVWR / 50 ft. Low-Profile Triaxle Wedge Car Trailer" [online], [retrieved on Jan. 11, 2021]. Retrieved from the Internet <URL: https://www.kaufmantrailers.com/car-trailers/wedge-car-haulers/14000-18000-50-low-profile-wedge-car/>.

Mohrbacher, H. et al. "Innovative manufacturing technology enabling light weighting with steel in commercial vehicles", Ad. Manuf., 3:3-18, Mar. 13, 2015.

AL-KO, "New AL-KO Vario X chassis: Impresses with its lightness" [online], [retrieved on Jan. 11, 2021]. Retrieved from the Internet <URL: https://www.alko-tech.com/en/news/2019/new-al-ko-vario-x-chassis-impresses-its-lightness>.

English Abstract of CN205854276U, "Trailer Frame", published on Jan. 4, 2017.

English Abstract of CN105235578A, "Highway Transport Vehicle", published on Jan. 13, 2016.

English Abstract of CN103332223A, "Integral Load-Carrying Chassis and Full Load-Carrying Cargo Compartment", published on Oct. 2, 2013.

\* cited by examiner

SHOCK DEFLECTING TRAILER WALL PANEL AND BEAM ASSEMBLY AND TRUCK TRAILER USING SAME

CROSS-REFERENCE TO RELATED APPLICATIONS

The present application claims priority from U.S. application No. 63/285,646 filed on Dec. 3, 2021, and Canadian application No. 3,141,048 filed on Dec. 3, 2021. These documents are hereby incorporated by reference in their entirety.

TECHNICAL FIELD

The present disclosure relates generally to shock deflecting truck trailer and more specifically, to a shock deflecting trailer wall panel and beam assembly and a truck trailer using the same.

BACKGROUND

Figure 1:
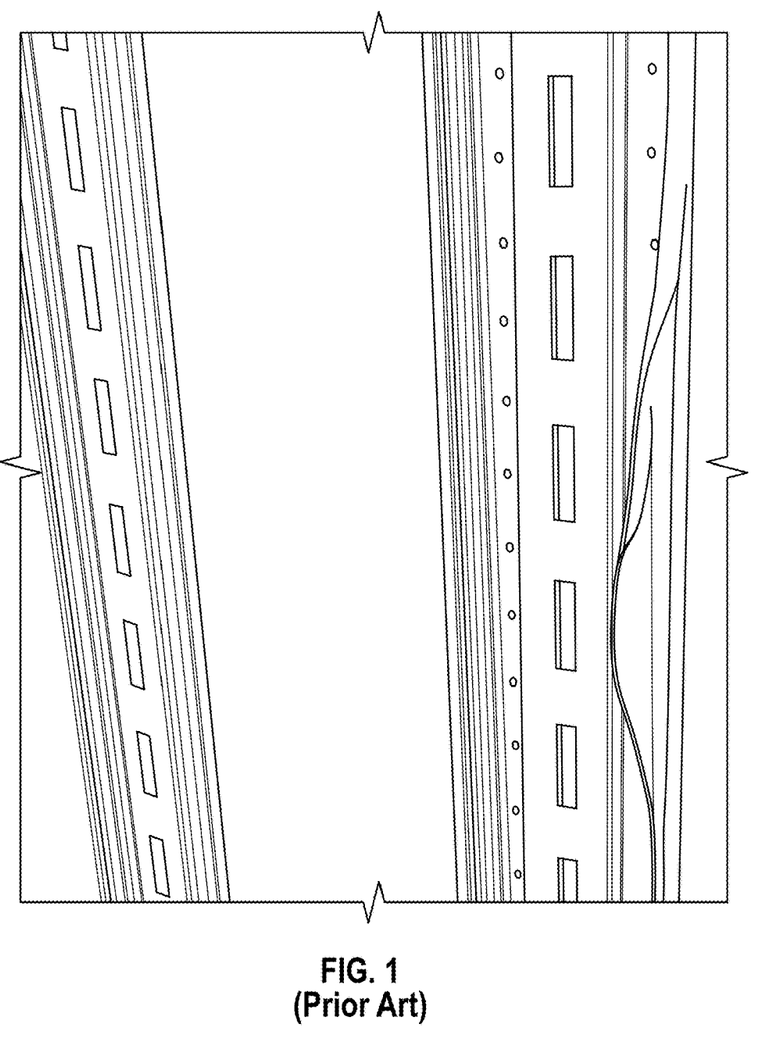
FIG. 1 shows deformation resulting from shock on a wall assembly of the prior art.

A trailer is an unpowered vehicle towed by a powered vehicle. Truck trailers, including flatbed trailers, step deck trailers, enclosed box trailers, semi-trailers, and the like, are commonly used to transport various goods and materials. However, upon manipulation of loads inside of the trailer, beams are often damaged, as shown in FIG. 1, by friction, forces being exerted upon the beams, and damage caused by cargo or equipment, for example forklifts, mainly because the beams protrude from the wall panels. Such damage to the beams can shorten the lifespan of the beams and cause a need for more frequent replacement of the beams, which can be expensive and increases the costs associated with maintaining and/or replacing parts of the trailer or the trailer itself.

Accordingly, there is a need shock deflecting truck trailer assemblies, that allow for a force directed at a trailer truck wall panel and beam to be directed away from the beam thereby preserving the structural integrity of the beam and its arrangement with the wall panel. Such a truck trailer assembly would require less frequent replacement of parts or the trailer itself, thereby reducing the amount of waste generated from maintenance and repairs of trailers as compared to trailers previously known in the art.

SUMMARY

The present disclosure aims to provide an improved trailer wall panel and beam assembly, especially for a truck trailer, which deflects shocked directed at the beam and can preserve the structural integrity of the beam and the connection between the wall panel and beam as compared to previously used beam assemblies and truck trailers.

Accordingly, the present disclosure provides a shock deflecting wall panel and beam assembly and truck trailer using the same.

Accordingly, a first aspect of the disclosure provides a trailer wall panel assembly comprising:
  at least one wall panel having at least one edge, the at least one edge bent to form a first wall corner and a second wall corner,
  a first leg between the first wall corner and the second wall corner and extending from the first wall corner in a generally inward direction towards the wall, and
  a second leg extending from the second wall corner in a generally outward direction from the wall; and
  at least one beam comprising:
    at least one edge bent to form a first beam corner, a second beam corner and a third beam corner,
    a first arm between the first beam corner and the second beam corner and extending from the first corner in a generally outward direction from the wall, an intermediate section extending from the second beam corner and the third beam corner, and
    a second arm extending from the third beam corner in a generally inward direction towards the wall, wherein the first and second arms are substantially parallel to one another,
  wherein the at least one edge of the at least one beam is configured to be received and retained within the at least one edge of the at least one wall panel.

In some embodiments, the second arm of the at least one beam is configured to abut the second leg of the at least one wall panel such that a shock is to be deflected away from the at least one beam while maintaining the at least one edge of the at least one beam received and retained within the at least one edge of the at least one wall panel.

In some embodiments, the shock is a force directed towards the at least one edge of the at least one beam and the deflection of the shock comprises the redirection of the force away from the at least one edge of the at least one beam.

In some embodiments, the force is redirected along the intermediate section of the at least one edge of the at least one beam.

In some embodiments, the deflection of the shock away from the at least one beam dissipates a force of the shock and preserves integrity of the at least one beam.

In some embodiments, the first wall corner of each of the at least one wall panel and the second beam corner of each of the at least one beam are to extend substantially the same distance from the wall.

In some embodiments, the second arm of the at least one beam is to be received and retained within the second wall corner of the at least one wall panel.

In some embodiments, the second arm of the at least one beam and at least a part of the intermediate portion of the at least one beam are to be received and retained within the second wall corner of the at least one wall panel.

In some embodiments, the first beam corner defines an angle of about 95 degrees to about 115 degrees. In some embodiments, the first beam corner defines an angle of about 100 degrees to about 110 degrees. In some embodiments, the first beam corner defines an angle of about 105 degrees.

In some embodiments, the second beam corner defines an angle of about 70 degrees to about 90 degrees. In some embodiments, the second beam corner defines an angle of about 75 degrees to about 85 degrees. In some embodiments, the second beam corner defines an angle of about 79 degrees.

In some embodiments, the third beam corner defines an angle of about 90 degrees to about 110 degrees. In some embodiments, the third beam corner defines an angle of about 95 degrees to about 105 degrees. In some embodiments, the third beam corner defines an angle of about 100 degrees.

In some embodiments, the at least one beam further comprises at least one transitionary section.

In some embodiments, the at least one beam comprises a first and second edge.

In some embodiments, the at least one transitionary section is between the first and second edge. In some embodiments, the at least one transitionary section is substantially flat.

In some embodiments, the at least one transitionary section comprises at least one flat portion and at least one raised portion. In some embodiments, the at least one transitionary section comprises:
- a first flat portion bent to form a first transitionary corner,
- a first arm extending from the first transitionary corner in a generally outward direction from the wall bent to form a second transitionary corner,
- an intermediate section extending from the second transitionary corner and bent at a third transitionary corner,
- a second arm extending from the third transitionary corner in a generally inward direction towards the wall and bent at a fourth transitionary corner, and
- a second flat portion extending from the fourth transitionary corner in a generally inward direction towards the wall.

In some embodiments, the first arm and second arm of the transitionary section are substantially parallel. In some embodiments, the first arm and second arm of the transitionary section have substantially the same length.

In some embodiments, the first, second, third, and fourth transitionary corners define an angle of about 80 degrees to 100 degrees. In some embodiments, the first, second, third, and fourth transitionary corners define an angle of about 90 degrees.

In some embodiments, the at least one transitionary section and the first wall corner of the at least one wall panel are to extend substantially the same distance from the wall.

In some embodiments, the at least one raised portion of the at least one transitionary section of the beam is supported by foam.

In some embodiments, the assembly is configured to define an interior of a cargo receiving container In some embodiments, the cargo receiving container is a trailer having a chassis with wheels.

In some embodiments, the cargo receiving container further comprises a frame. In some embodiments, the at least one beam is configured to be secured to the frame. In some embodiments, wherein the beam is screwed to the frame.

In some embodiments, the beam is substantially the same length as the at least one wall panel.

In some embodiments, the at least one edge of the at least one beam extends substantially the entire length of the beam.

In some embodiments, the entire length of the at least one edge of the at least one beam is received and retained within the entire length of the at least one edge of the at least one wall panel.

In some embodiments, the at least one beam and the at least one edge of the at least one beam are configured to extend substantially vertically and the at least one wall panel and the at least one edge of the at least one wall panel are configured to extend substantially vertically.

In some embodiments, the height of the at least one beam and the at least one wall panel is substantially the same.

In some embodiments, the height of the at least one edge of the at least one beam and the at least one edge of the at least one wall panel is substantially the same.

In some embodiments, the at least one beam is made of steel.

In some embodiments, any assembly described herein comprises a plurality of wall panels and a plurality of beams.

Another aspect of the disclosure includes a beam comprising:
- at least one edge bent to form a first beam corner, a second beam corner and a third beam corner,
- a first arm between the first beam corner and the second beam corner and extending from the first beam corner in a generally outward direction from a wall, an intermediate section extending from the second beam corner and the third beam corner, and
- a second arm extending from the third beam corner in a generally inward direction towards the wall, wherein the first and second arms are substantially parallel to one another, and the beam is configured to be substantially vertically extending.

In some embodiments, the first beam corner defines an angle of about 95 degrees to about 115 degrees. In some embodiments, the first beam corner defines an angle of about 105 degrees.

In some embodiments, the second beam corner defines an angle of about 70 degrees to about 90 degrees. In some embodiments, the second beam corner defines an angle of about 79 degrees.

In some embodiments, the third beam corner defines an angle of about 90 degrees to about 110 degrees. In some embodiments, the third beam corner defines an angle of about 100 degrees.

In some embodiments, the beam further comprises a transitionary section. In some embodiments, the beam comprises a first and second edge. In some embodiments, the at least one transitionary section is between the first and second edge. In some embodiments, the transitionary section is substantially flat. In some embodiments, the transitionary section comprises at least one flat portion and at least one raised portion.

In some embodiments, wherein the transitionary section comprises:
- a first flat portion bent to form a first transitionary corner,
- a first arm extending from the first transitionary corner in a generally outward direction from the wall and bent to form a second transitionary corner,
- an intermediate section extending from the second corner and bent to form a third transitionary corner,
- a second arm extending from the third transitionary corner in a generally inward direction towards the wall and bent at a fourth transitionary corner, and
- a second flat portion extending from the fourth transitionary corner.

In some embodiments, the first arm and second arm are substantially parallel to one another.

In some embodiments, the first arm and second arm are substantially the same height.

In some embodiments, the first, second, third, and fourth transitionary corners define an angle of about 80 degrees to 100 degrees.

In some embodiments, the first, second, third, and fourth transitionary corners define an angle of about 90 degrees.

In some embodiments, the at least one raised portion of the at least one transitionary section of the beam is supported by foam.

In some embodiments, any assembly described herein comprises the at least one beam as described herein.

Another aspect of the disclosure includes a method of assembling a shock deflecting wall panel assembly, the method comprising:
- providing at least one wall panel having at least one edge, the at least one edge bent at a first angle to form a first leg extending downward bent at a second angle to form a second leg extending upward;
- providing at least one beam comprising:
  - at least one edge bent to form a first beam corner, a second beam corner and a third beam corner, a first arm between the first beam corner and the second beam corner and extending from the first beam corner in a generally outward direction from the wall, an intermediate section extending from the second beam corner and the third beam corner, and a second arm extending from the third beam corner in a generally inward direction towards the wall, wherein the first and second arms are substantially parallel to one another; and coupling the at least one edge of the beam with the at least one wall panel, wherein the at least one edge of the beam is received and retained in the second wall corner of the at least one wall panel in a configuration allowing for deflection of a shock away from the at least one beam.

In some embodiments, the at least one wall panel is any of the at least one wall panels as described herein. In some embodiments, the at least one beam is secured to a frame of an interior of a cargo receiving container. In some embodiments, the shock deflecting wall panel assembly is any assembly as described herein.

Another aspect of the disclosure includes a method of assembling a cargo receiving container, the method comprising assembling at least one wall panel having at least one edge, the at least one edge bent at a first angle to form a first leg extending downward bent at a second angle to form a second leg extending upward; providing at least one beam comprising:

at least one edge bent to form a first beam corner, a second beam corner and a third beam corner, a first arm between the first beam corner and the second beam corner and extending from the first beam corner in a generally outward direction from the wall, an intermediate section extending from the second beam corner and the third beam corner, and a second arm extending from the third beam corner in a generally inward direction towards the wall, wherein the first and second arms are substantially parallel to one another; and coupling the at least one edge of the beam with the at least one wall panel, wherein the at least one edge of the beam is received and retained in the second wall corner of the at least one wall panel in a configuration allowing for deflection of a shock away from the at least one beam.

In some embodiments, the at least one wall panel and at least one beam are the at least one wall panel and at least one beam of any assembly described herein.

In some embodiments, the at least one beam is any beam described herein.

Another aspect of the disclosure includes use of any assembly or beam of described herein to deflect a shock to the beam.

Another aspect of the disclosure includes use of any assembly or beam described herein to define an interior of a container. In some embodiments, the container is a cargo receiving container.

Another aspect of the disclosure includes a truck trailer comprising at least one wall panel, at least one beam and a frame, wherein the at least one wall panel comprises:

at least one edge, the at least one edge bent to form a first wall corner and a second wall corner, a first leg between the first wall corner and the second wall corner and extending from the first wall corner in a generally inward direction towards the wall, and a second leg extending from the second wall corner in a generally outward direction from the wall; and the at least one beam comprises:

at least one edge bent to form a first beam corner, a second beam corner and a third beam corner, a first arm between the first beam corner and the second beam corner and extending from the first beam corner in a generally outward direction from the wall, an intermediate section extending from the second beam corner and the third beam corner, and a second arm extending from the third beam corner in a generally inward direction towards the wall, wherein the first and second arms are substantially parallel to one another, and wherein the at least one edge of the at least one beam is received and retained within the at least one edge of the at least one wall panel.

In some embodiments, the second arm of the at least one beam abuts the second leg of the at least wall panel such that a shock is deflected away from the at least one beam while maintaining the at least one edge of the at least one beam received and retained within the at least one edge of the at least one wall panel.

In some embodiments, the shock is a force directed towards the at least one edge of the at least one beam and the deflection of the shock comprises the redirection of the force away from the at least one edge of the at least one beam.

In some embodiments, the force is redirected along the intermediate section of the at least one edge of the at least one beam.

In some embodiments, the deflection of the shock away from the at least one beam dissipates a force of the shock and preserves integrity of the at least one beam.

In some embodiments, the first wall corner of each of the at least one wall panel and the second beam corner of each of the at least one beam are to extend substantially the same distance from the wall.

In some embodiments, the second arm of the at least one beam is retained within the second wall corner of the at least one wall panel.

In some embodiments, the second arm and at least a part of the intermediate portion of the at least one beam are retained within the second wall corner of the at least one wall panel.

In some embodiments, the second arm of the at least one beam and at least a part of the intermediate portion of the at least one beam are retained and received within the second wall corner of the at least one beam.

In some embodiments, the first beam corner defines an angle of about 95 degrees to about 115 degrees. In some embodiments, the first beam corner defines an angle of about 100 degrees to about 110 degrees. In some embodiments, the first beam corner defines an angle of about 105 degrees.

In some embodiments, the second beam corner defines an angle of about 70 degrees to about 90 degrees. In some embodiments, the second beam corner defines an angle of about 75 degrees to about 85 degrees. In some embodiments, the second beam corner defines an angle of about 79 degrees.

In some embodiments, the third beam corner defines an angle of about 90 degrees to about 110 degrees. In some embodiments, the third beam corner defines an angle of about 95 degrees to about 105 degrees. In some embodiments, the third beam corner defines an angle of about 100 degrees.

In some embodiments, the at least one beam further comprises at least one transitionary section. In some embodiments, the at least one beam comprises a first and second edge.

In some embodiments, the at least one transitionary section is between the first and second edge. In some embodiments, the at least one transitionary section is substantially flat. In some embodiments, the at least one transitionary section comprises at least one flat portion and at least one raised portion.

In some embodiments, the at least one transitionary section comprises:
a first flat portion bent to form a first transitionary corner,
a first arm extending from the first transitionary corner in a generally outward direction from the wall bent to form a second transitionary corner,
an intermediate section extending from the second transitionary corner and bent at a third transitionary corner
a second arm extending from the third transitionary corner in a generally inward direction towards the wall and bent at a fourth transitionary corner, and
a second flat portion extending from the fourth transitionary corner in a generally inward direction towards the wall.

In some embodiments, the first arm and second arm of the transitionary section are substantially parallel. In some embodiments, the first arm and second arm of the transitionary section are substantially the same length.

In some embodiments, the first, second, third, and fourth transitionary corners define an angle of about 80 degrees to 100 degrees. In some embodiments, the first, second, third, and fourth transitionary corners define an angle of about 90 degrees.

In some embodiments, the at least one transitionary section and the first wall corner of the at least one wall panel are to extend substantially the same distance from the wall.

In some embodiments, the at least one raised portion of the at least one transitionary section of the beam is supported by foam.

In some embodiments, the at least one beam is secured to the frame. In some embodiments, the beam is screwed to the frame.

In some embodiments, the beam is substantially the same length as the at least one wall panel.

In some embodiments, the at least one edge of the at least one beam extends substantially the entire length of the beam.

In some embodiments, the entire length of the at least one edge of the at least one beam is received and retained within the entire length of the at least one edge of the at least one wall panel.

In some embodiments, the at least one beam and the at least one edge of the at least one beam extend substantially vertically and the at least one wall panel and the at least one edge of the at least one wall panel extend substantially vertically.

In some embodiments, the height of the at least one beam and the at least one wall panel is the same.

In some embodiments, the height of the at least one edge of the at least one beam and the at least one edge of the at least one wall panel is the same.

In some embodiments, the at least one beam is made of steel.

In some embodiments, any truck trailer described herein comprises a plurality of wall panels and a plurality of beams.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

To promote an understanding of the principles of the disclosure, reference will now be made to the features illustrated in the drawings and no limitation of the scope of the disclosure is hereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein, "assembly" includes one or more separate parts that are to be assembled or are assembled.

Where two or more ranges are used, such as but not limited to 1 to 5 or 2 to 4, any number between or inclusive of these ranges is implied.

The present disclosure aims to provide an improved trailer wall panel and beam assembly, especially for a truck trailer, which deflects shocked directed at the beam and can preserve the structural integrity of the beam and the connection between the wall panel and beam as compared to previously used beam assemblies and truck trailers.

Accordingly, the present disclosure provides a shock deflecting wall panel and beam assembly and truck trailer using the same.

Accordingly, a first aspect of the disclosure provides a trailer wall panel assembly comprising:
　at least one wall panel having at least one edge, the at least one edge bent to form a first wall corner and a second wall corner,
　a first leg between the first wall corner and the second wall corner and extending from the first wall corner in a generally inward direction towards the wall, and
　a second leg extending from the second wall corner in a generally outward direction from the wall; and
　at least one beam comprising:
　　at least one edge bent to form a first beam corner, a second beam corner and a third beam corner,
　　a first arm between the first beam corner and the second beam corner and extending from the first corner in a generally outward direction from the wall, an intermediate section extending from the second beam corner and the third beam corner, and
　　a second arm extending from the third beam corner in a generally inward direction towards the wall, wherein the first and second arms are substantially parallel to one another,
wherein the at least one edge of the at least one beam is configured to be received and retained within the at least one edge of the at least one wall panel.

In some embodiments, the second arm of the at least one beam is configured to abut the second leg of the at least one wall panel such that a shock is to be deflected away from the at least one beam while maintaining the at least one edge of the at least one beam received and retained within the at least one edge of the at least one wall panel.

In some embodiments, the shock is a force directed towards the at least one edge of the at least one beam and the deflection of the shock comprises the redirection of the force away from the at least one edge of the at least one beam.

In some embodiments, the force is redirected along the intermediate section of the at least one edge of the at least one beam.

In some embodiments, the deflection of the shock away from the at least one beam dissipates a force of the shock and preserves integrity of the at least one beam.

In some embodiments, the first wall corner of each of the at least one wall panel and the second beam corner of each of the at least one beam are to extend substantially the same distance from the wall.

In some embodiments, the second arm of the at least one beam is to be received and retained within the second wall corner of the at least one wall panel.

In some embodiments, the second arm of the at least one beam and at least a part of the intermediate portion of the at least one beam are to be received and retained within the second wall corner of the at least one wall panel.

In some embodiments, the first beam corner defines an angle of about 95 degrees to about 115 degrees. In some embodiments, the first beam corner defines an angle of about 100 degrees to about 110 degrees. In some embodiments, the first beam corner defines an angle of about 105 degrees.

In some embodiments, the second beam corner defines an angle of about 70 degrees to about 90 degrees. In some embodiments, the second beam corner defines an angle of about 75 degrees to about 85 degrees. In some embodiments, the second beam corner defines an angle of about 79 degrees.

In some embodiments, the third beam corner defines an angle of about 90 degrees to about 110 degrees. In some embodiments, the third beam corner defines an angle of about 95 degrees to about 105 degrees. In some embodiments, the third beam corner defines an angle of about 100 degrees.

In some embodiments, the at least one beam further comprises at least one transitionary section.

In some embodiments, the at least one beam comprises a first and second edge.

In some embodiments, the at least one transitionary section is between the first and second edge. In some embodiments, the at least one transitionary section is substantially flat.

In some embodiments, the at least one transitionary section comprises at least one flat portion and at least one raised portion. In some embodiments, the at least one transitionary section comprises:
 a first flat portion bent to form a first transitionary corner,
 a first arm extending from the first transitionary corner in a generally outward direction from the wall bent to form a second transitionary corner,
 an intermediate section extending from the second transitionary corner and bent at a third transitionary corner,
 a second arm extending from the third transitionary corner in a generally inward direction towards the wall and bent at a fourth transitionary corner, and
 a second flat portion extending from the fourth transitionary corner in a generally inward direction towards the wall.

In some embodiments, the first arm and second arm of the transitionary section are substantially parallel. In some embodiments, the first arm and second arm of the transitionary section have substantially the same length.

In some embodiments, the first, second, third, and fourth transitionary corners define an angle of about 80 degrees to 100 degrees. In some embodiments, the first, second, third, and fourth transitionary corners define an angle of about 90 degrees.

In some embodiments, the at least one transitionary section and the first wall corner of the at least one wall panel are to extend substantially the same distance from the wall.

In some embodiments, the at least one raised portion of the at least one transitionary section of the beam is supported by foam.

In some embodiments, the assembly is configured to define an interior of a cargo receiving container. In some embodiments, the cargo receiving container is a trailer having a chassis with wheels.

In some embodiments, the cargo receiving container further comprises a frame. In some embodiments, the at least one beam is configured to be secured to the frame. In some embodiments, wherein the beam is screwed to the frame. It will be appreciated that other securing means may be used and this would be within the purview of a skilled person in the art.

In some embodiments, the beam is substantially the same length as the at least one wall panel.

In some embodiments, the at least one edge of the at least one beam extends substantially the entire length of the beam.

In some embodiments, the entire length of the at least one edge of the at least one beam is received and retained within the entire length of the at least one edge of the at least one wall panel.

In some embodiments, the at least one beam and the at least one edge of the at least one beam are configured to extend substantially vertically and the at least one wall panel and the at least one edge of the at least one wall panel are configured to extend substantially vertically.

In some embodiments, the height of the at least one beam and the at least one wall panel is substantially the same.

In some embodiments, the height of the at least one edge of the at least one beam and the at least one edge of the at least one wall panel is substantially the same.

In some embodiments, the at least one beam is made of steel. It will be appreciated that any resistant material may be used and this would be within the purview of a skilled person in the art.

In some embodiments, any assembly described herein comprises a plurality of wall panels and a plurality of beams.

Another aspect of the disclosure includes a beam comprising:
 at least one edge bent to form a first beam corner, a second beam corner and a third beam corner,
 a first arm between the first beam corner and the second beam corner and extending from the first beam corner in a generally outward direction from a wall, an intermediate section extending from the second beam corner and the third beam corner, and
 a second arm extending from the third beam corner in a generally inward direction towards the wall, wherein the first and second arms are substantially parallel to one another, and the beam is configured to be substantially vertically extending.

In some embodiments, the first beam corner defines an angle of about 95 degrees to about 115 degrees. In some embodiments, the first beam corner defines an angle of about 105 degrees.

In some embodiments, the second beam corner defines an angle of about 70 degrees to about 90 degrees. In some embodiments, the second beam corner defines an angle of about 79 degrees.

In some embodiments, the third beam corner defines an angle of about 90 degrees to about 110 degrees. In some embodiments, the third beam corner defines an angle of about 100 degrees.

In some embodiments, the beam further comprises a transitionary section. In some embodiments, the beam comprises a first and second edge. In some embodiments, the at least one transitionary section is between the first and second edge. In some embodiments, the transitionary section is substantially flat. In some embodiments, the transitionary section comprises at least one flat portion and at least one raised portion.

In some embodiments, wherein the transitionary section comprises:
 a first flat portion bent to form a first transitionary corner,
 a first arm extending from the first transitionary corner in a generally outward direction from the wall and bent to form a second transitionary corner,
 an intermediate section extending from the second corner and bent to form a third transitionary corner,
 a second arm extending from the third transitionary corner in a generally inward direction towards the wall and bent at a fourth transitionary corner, and
 a second flat portion extending from the fourth transitionary corner.

In some embodiments, the first arm and second arm are substantially parallel to one another.

In some embodiments, the first arm and second arm are substantially the same height.

In some embodiments, the first, second, third, and fourth transitionary corners define an angle of about 80 degrees to 100 degrees.

In some embodiments, the first, second, third, and fourth transitionary corners define an angle of about 90 degrees.

In some embodiments, the at least one raised portion of the at least one transitionary section of the beam is supported by foam.

In some embodiments, any assembly described herein comprises the at least one beam as described herein.

Another aspect of the disclosure includes a method of assembling a shock deflecting wall panel assembly, the method comprising:
- providing at least one wall panel having at least one edge, the at least one edge bent at a first angle to form a first leg extending downward bent at a second angle to form a second leg extending upward;
- providing at least one beam comprising:
  - at least one edge bent to form a first beam corner, a second beam corner and a third beam corner, a first arm between the first beam corner and the second beam corner and extending from the first beam corner in a generally outward direction from the wall, an intermediate section extending from the second beam corner and the third beam corner, and a second arm extending from the third beam corner in a generally inward direction towards the wall, wherein the first and second arms are substantially parallel to one another; and
- coupling the at least one edge of the beam with the at least one wall panel,
- wherein the at least one edge of the beam is received and retained in the second wall corner of the at least one wall panel in a configuration allowing for deflection of a shock away from the at least one beam.

In some embodiments, the at least one wall panel is any of the at least one wall panels as described herein. In some embodiments, the at least one beam is secured to a frame of an interior of a cargo receiving container. In some embodiments, the shock deflecting wall panel assembly is any assembly as described herein.

Another aspect of the disclosure includes a method of assembling a cargo receiving container, the method comprising assembling at least one wall panel having at least one edge, the at least one edge bent at a first angle to form a first leg extending downward bent at a second angle to form a second leg extending upward; providing at least one beam comprising:
- at least one edge bent to form a first beam corner, a second beam corner and a third beam corner,
- a first arm between the first beam corner and the second beam corner and extending from the first beam corner in a generally outward direction from the wall,
- an intermediate section extending from the second beam corner and the third beam corner, and
- a second arm extending from the third beam corner in a generally inward direction towards the wall, wherein the first and second arms are substantially parallel to one another; and
- coupling the at least one edge of the beam with the at least one wall panel,
- wherein the at least one edge of the beam is received and retained in the second wall corner of the at least one wall panel in a configuration allowing for deflection of a shock away from the at least one beam.

In some embodiments, the at least one wall panel and at least one beam are the at least one wall panel and at least one beam of any assembly described herein.

In some embodiments, the at least one beam is any beam described herein.

Another aspect of the disclosure includes use of any assembly or beam of described herein to deflect a shock to the beam.

Another aspect of the disclosure includes use of any assembly or beam described herein to define an interior of a container. In some embodiments, the container is a cargo receiving container.

Another aspect of the disclosure includes a truck trailer comprising at least one wall panel, at least one beam and a frame, wherein the at least one wall panel comprises:
- at least one edge, the at least one edge bent to form a first wall corner and a second wall corner,
- a first leg between the first wall corner and the second wall corner and extending from the first wall corner in a generally inward direction towards the wall, and
- a second leg extending from the second wall corner in a generally outward direction from the wall; and the at least one beam comprises:
- at least one edge bent to form a first beam corner, a second beam corner and a third beam corner,
- a first arm between the first beam corner and the second beam corner and extending from the first beam corner in a generally outward direction from the wall, an intermediate section extending from the second beam corner and the third beam corner, and
- a second arm extending from the third beam corner in a generally inward direction towards the wall,
- wherein the first and second arms are substantially parallel to one another, and
- wherein the at least one edge of the at least one beam is received and retained within the at least one edge of the at least one wall panel.

In some embodiments, the second arm of the at least one beam abuts the second leg of the at least wall panel such that a shock is deflected away from the at least one beam while maintaining the at least one edge of the at least one beam received and retained within the at least one edge of the at least one wall panel.

In some embodiments, the shock is a force directed towards the at least one edge of the at least one beam and the deflection of the shock comprises the redirection of the force away from the at least one edge of the at least one beam.

In some embodiments, the force is redirected along the intermediate section of the at least one edge of the at least one beam.

In some embodiments, the deflection of the shock away from the at least one beam dissipates a force of the shock and preserves integrity of the at least one beam.

In some embodiments, the first wall corner of each of the at least one wall panel and the second beam corner of each of the at least one beam are to extend substantially the same distance from the wall.

In some embodiments, the second arm of the at least one beam is retained within the second wall corner of the at least one wall panel.

In some embodiments, the second arm and at least a part of the intermediate portion of the at least one beam are retained within the second wall corner of the at least one wall panel.

In some embodiments, the second arm of the at least one beam and at least a part of the intermediate portion of the at least one beam are retained and received within the second wall corner of the at least one beam.

In some embodiments, the first beam corner defines an angle of about 95 degrees to about 115 degrees. In some embodiments, the first beam corner defines an angle of about 100 degrees to about 110 degrees. In some embodiments, the first beam corner defines an angle of about 105 degrees.

In some embodiments, the second beam corner defines an angle of about 70 degrees to about 90 degrees. In some embodiments, the second beam corner defines an angle of about 75 degrees to about 85 degrees. In some embodiments, the second beam corner defines an angle of about 79 degrees.

In some embodiments, the third beam corner defines an angle of about 90 degrees to about 110 degrees. In some embodiments, the third beam corner defines an angle of about 95 degrees to about 105 degrees. In some embodiments, the third beam corner defines an angle of about 100 degrees.

In some embodiments, the at least one beam further comprises at least one transitionary section. In some embodiments, the at least one beam comprises a first and second edge.

In some embodiments, the at least one transitionary section is between the first and second edge. In some embodiments, the at least one transitionary section is substantially flat. In some embodiments, the at least one transitionary section comprises at least one flat portion and at least one raised portion.

In some embodiments, the at least one transitionary section comprises:
  a first flat portion bent to form a first transitionary corner,
  a first arm extending from the first transitionary corner in a generally outward direction from the wall bent to form a second transitionary corner,
  an intermediate section extending from the second transitionary corner and bent at a third transitionary corner
  a second arm extending from the third transitionary corner in a generally inward direction towards the wall and bent at a fourth transitionary corner, and
  a second flat portion extending from the fourth transitionary corner in a generally inward direction towards the wall.

In some embodiments, the first arm and second arm of the transitionary section are substantially parallel. In some embodiments, the first arm and second arm of the transitionary section are substantially the same length.

In some embodiments, the first, second, third, and fourth transitionary corners define an angle of about 80 degrees to 100 degrees. In some embodiments, the first, second, third, and fourth transitionary corners define an angle of about 90 degrees.

In some embodiments, the at least one transitionary section and the first wall corner of the at least one wall panel are to extend substantially the same distance from the wall.

In some embodiments, the at least one raised portion of the at least one transitionary section of the beam is supported by foam.

In some embodiments, the at least one beam is secured to the frame. In some embodiments, the beam is screwed to the frame.

In some embodiments, the beam is substantially the same length as the at least one wall panel.

In some embodiments, the at least one edge of the at least one beam extends substantially the entire length of the beam.

In some embodiments, the entire length of the at least one edge of the at least one beam is received and retained within the entire length of the at least one edge of the at least one wall panel.

In some embodiments, the at least one beam and the at least one edge of the at least one beam extend substantially vertically and the at least one wall panel and the at least one edge of the at least one wall panel extend substantially vertically.

In some embodiments, the height of the at least one beam and the at least one wall panel is the same.

In some embodiments, the height of the at least one edge of the at least one beam and the at least one edge of the at least one wall panel is the same.

In some embodiments, the at least one beam is steel.

In some embodiments, any truck trailer described herein comprises a plurality of wall panels and a plurality of beams.

Figure 2:
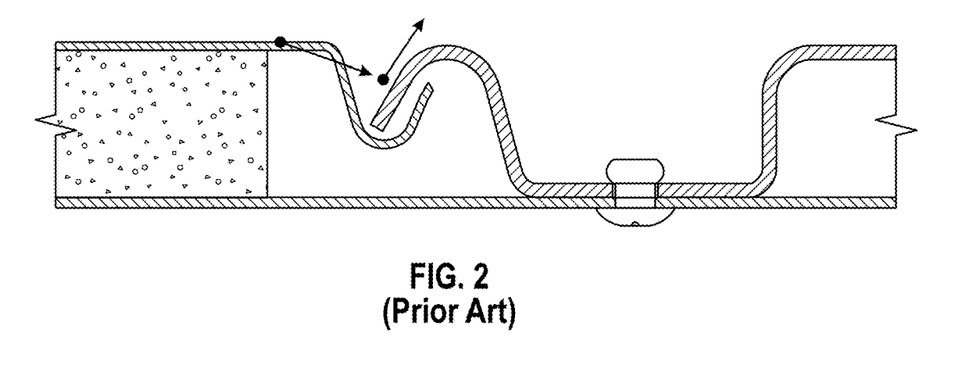
FIG. 2 is a top view of a shock deflecting wall panel and beam assembly when assembled of the prior art.

FIG. 2 shows a wall panel assembly of the prior art, where a force acts on the beam and may cause its deformation.

Figure 3:
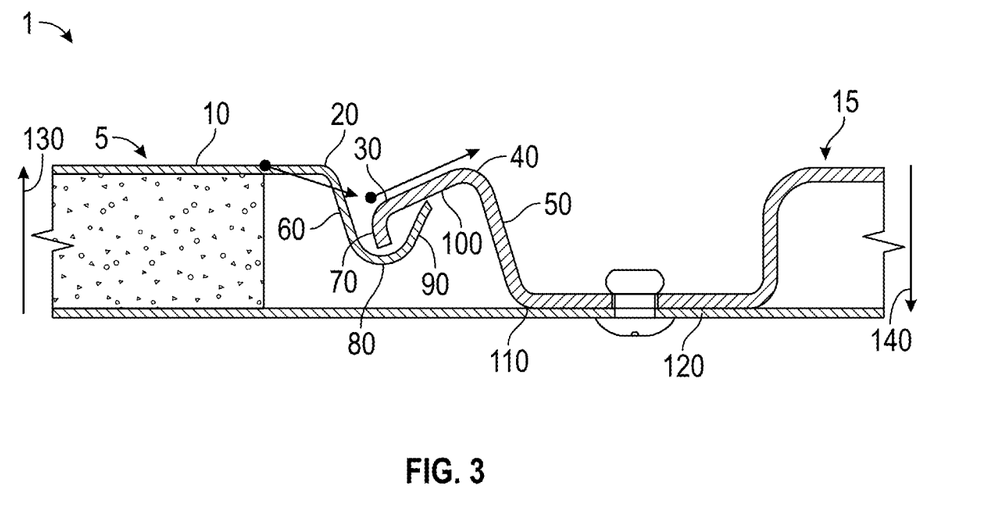
FIG. 3 is a top view of a shock deflecting wall panel and beam assembly when assembled according to one embodiment.

As shown in FIG. 3, the disclosure includes a trailer wall panel assembly comprising: at least one wall panel 5 having at least one edge 10, the at least one edge 10 bent to form a first wall corner 20 and a second wall corner 80, a first leg 60 between the first wall corner 20 and the second wall corner 80 and extending from the first wall corner 20 in a generally inward direction towards the wall as shown by arrow 140, and a second leg 90 extending from the second wall corner 80 in a generally outward direction from the wall as shown by arrow 130; and at least one beam 15 comprising: at least one edge 120 bent to form a first beam corner 110, a second beam corner 40 and a third beam corner 30, a first arm 50 between the first beam corner 110 and the second beam corner 40 and extending from the first corner 110 in a generally outward direction from the wall as shown by arrow 130, an intermediate section 100 extending from the second beam corner 40 and the third beam corner 30, and a second arm 70 extending from the third beam corner 30 in a generally inward direction towards the wall as shown by arrow 140, wherein the first arm 50 and second arm 70 are substantially parallel to one another. In FIG. 3, the wall panel 5 and beam 15 are shown as assembled, specifically, wherein the at least one edge 120 of the at least one beam 15 is received and retained within the at least one edge 10 of the at least one wall panel 5; however in some embodiments, the wall panel 5 and beam 15 are not assembled and the at least one edge 120 of the at least one beam 15 is to be received and retained within the at least one edge 10 of the at least one wall panel 5.

Figure 4:
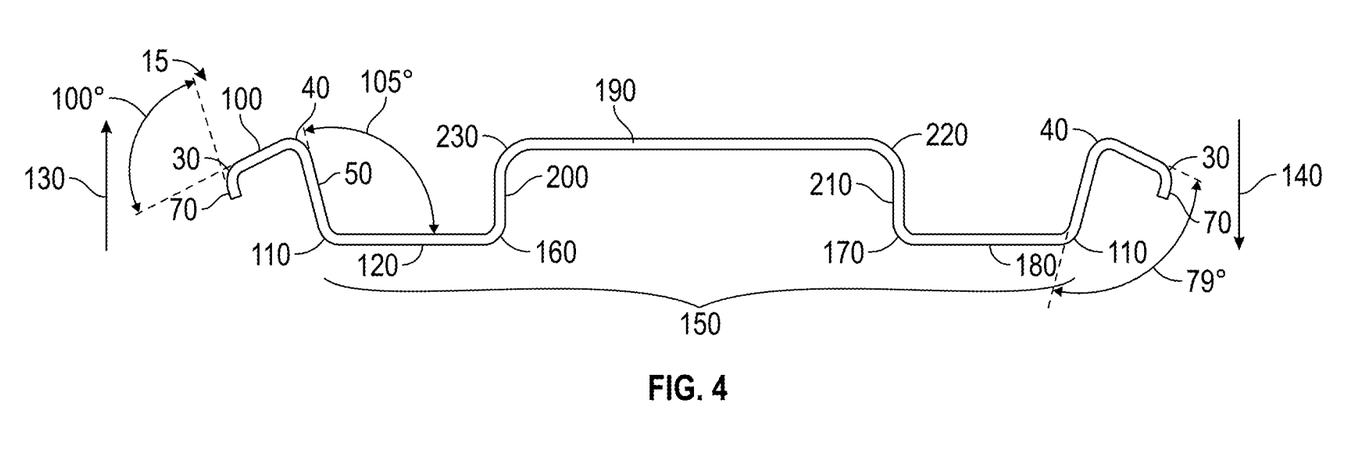
FIG. 4 is a top view of the at least one beam of the wall panel and beam assembly of FIG. 3.

Turning to FIG. 4, the disclosure includes a beam 15 comprising: at least one edge bent 120 to form a first beam corner 110, a second beam corner 40 and a third beam corner 30, a first arm 50 between the first beam corner 110 and the second beam corner 40 and extending from the first beam corner 40 in a generally outward direction from a wall as shown by arrow 130, an intermediate section 100 extending from the second beam corner 40 and the third beam corner 30, and a second arm 70 extending from the third beam corner 30 in a generally inward direction towards the wall as shown by arrow 140, wherein the first arm 50 and second arm 70 are substantially parallel to one another, and the beam 15 is configured to be substantially vertically extending. As shown in the example provided in FIG. 4, in some embodiments, the beam 15 further comprises a transitionary section 150. In this example, the beam 15 comprises a first edge 120 and second edge 180 and the at least one transitionary section 150 is between the first edge 120 and second edge 180.

As show in FIG. 4, in some embodiments, the transitionary section 150 comprises at least one flat portion, which in FIG. 4 are first and second edges 120 and 180, and at least one raised portion, which in this example is the intermediate section 190. In this example, the transitionary section comprises a first flat portion, which is first edge 120 bent to form a first transitionary corner 160, a first arm 200 extending from the first transitionary corner 160 in a generally outward direction from the wall as shown by arrow 130 and bent to form a second transitionary corner 230, an intermediate section 190 extending from the second corner 230 and bent to form a third transitionary corner 220, a second arm 210 extending from the third transitionary corner 220 in a generally inward direction towards the wall as shown by arrow 140 and bent at a fourth transitionary corner 170, and a second flat portion, which in this example is second edge 180, extending from the fourth transitionary corner 170. As shown in FIG. 4, the first arm 200 and second arm 210 can be substantially parallel to one another and substantially the same height.

In other examples, the transitionary section 150 is substantially flat.

Figure 5:
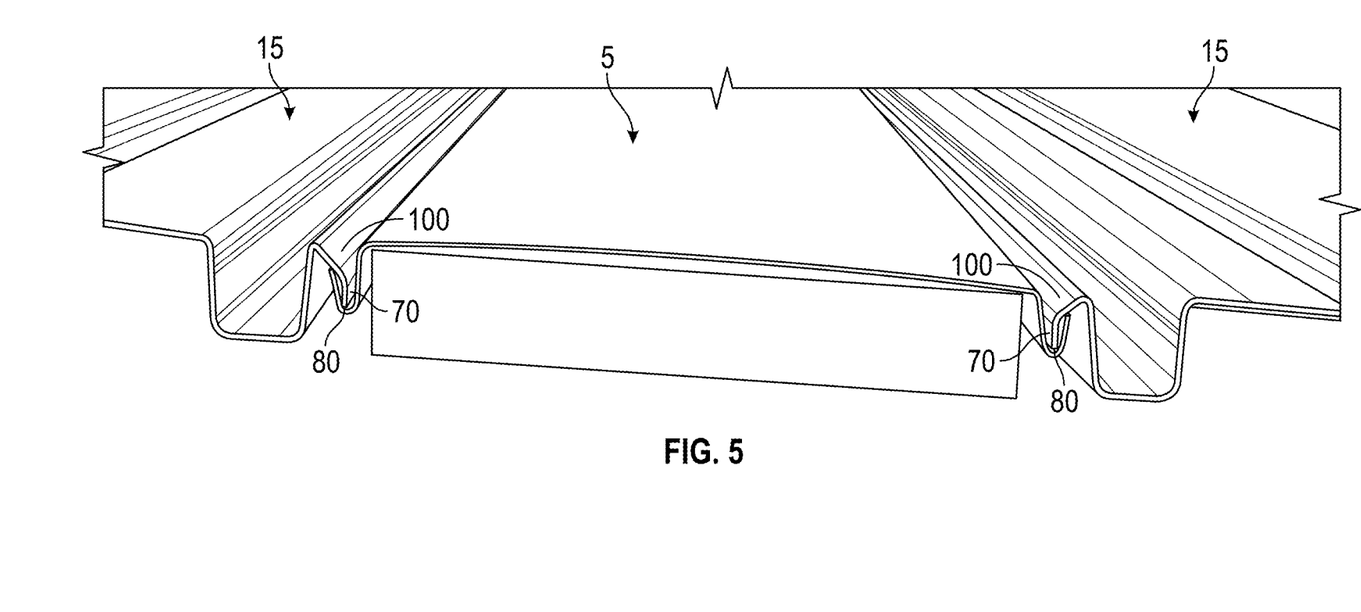
FIG. 5 is a top view of the shock deflecting wall panel and beam assembly of FIG. 3 according to one embodiment, when assembled.

As shown in FIG. 5 the first transitionary corner 160, second transitionary corner 230, third transitionary corner 220, and fourth transitionary corner 170 can define an angle of about 90 degrees. In other examples, the first transitionary corner 160, second transitionary corner 230, third transitionary corner 220, and fourth transitionary corner 170 define an angle of about 80 degrees to 100 degrees, the first beam corner 110 defines an angle of about 95 degrees to about 115 degrees, optionally an angle of about 105 degrees, the second beam corner 40 defines an angle of about 70 degrees to about 90 degrees, optionally an angle of about 79 degrees, the third beam corner 30 defines an angle of about 90 degrees to about 110 degrees, optionally an angle of about 100 degrees.

Figure 6:
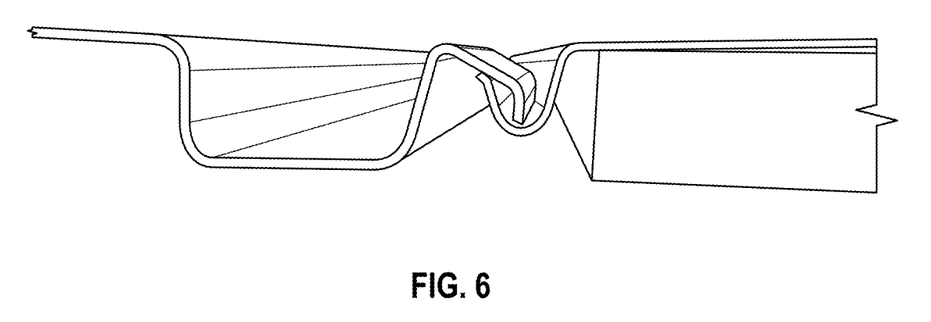
FIG. 6 is a top view of the shock deflecting wall panel and beam assembly of FIG. 3 according to one embodiment, when assembled.

Turning to FIG. 5, an embodiment is shown comprising one wall panel 5 and two beams 15, the second arm 70 and at least a part of the intermediate portion 100 of each beam 15 are retained within the second wall corner 80 of the at least one wall panel 5. An enlarged view of the embodiment showing the beam and wall panel is shown in FIG. 6.

Figure 7:
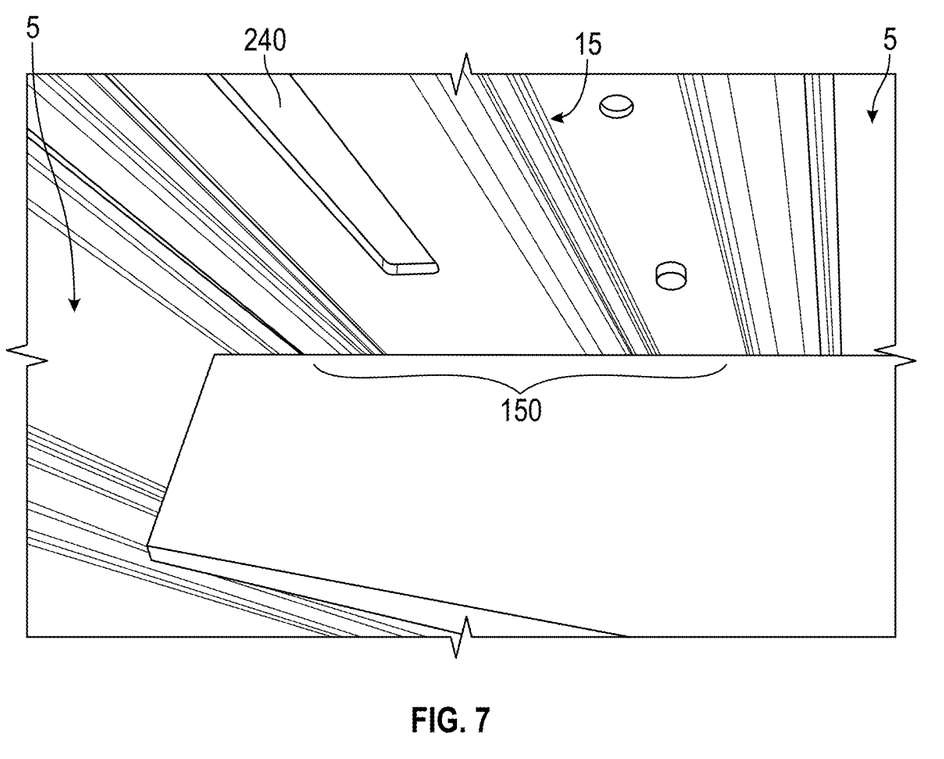
FIG. 7 is a perspective view of the shock deflecting wall panel and beam assembly of FIG. 3 according to one embodiment, when assembled.

As shown in FIG. 7, in some embodiments, the at least one raised portion of the at least one transitionary section 150, of the beam 15 is supported by foam 240 and/or the at least one transitionary section 150 and the first wall corner 20 of the at least one wall panel 5, in this example two wall panels 5, extend substantially the same distance from the wall. In this example the beam 15 and wall panels 5 are assembled. In other embodiments, the beam 15 and wall panels 5 are not assembled.

Figure 8:
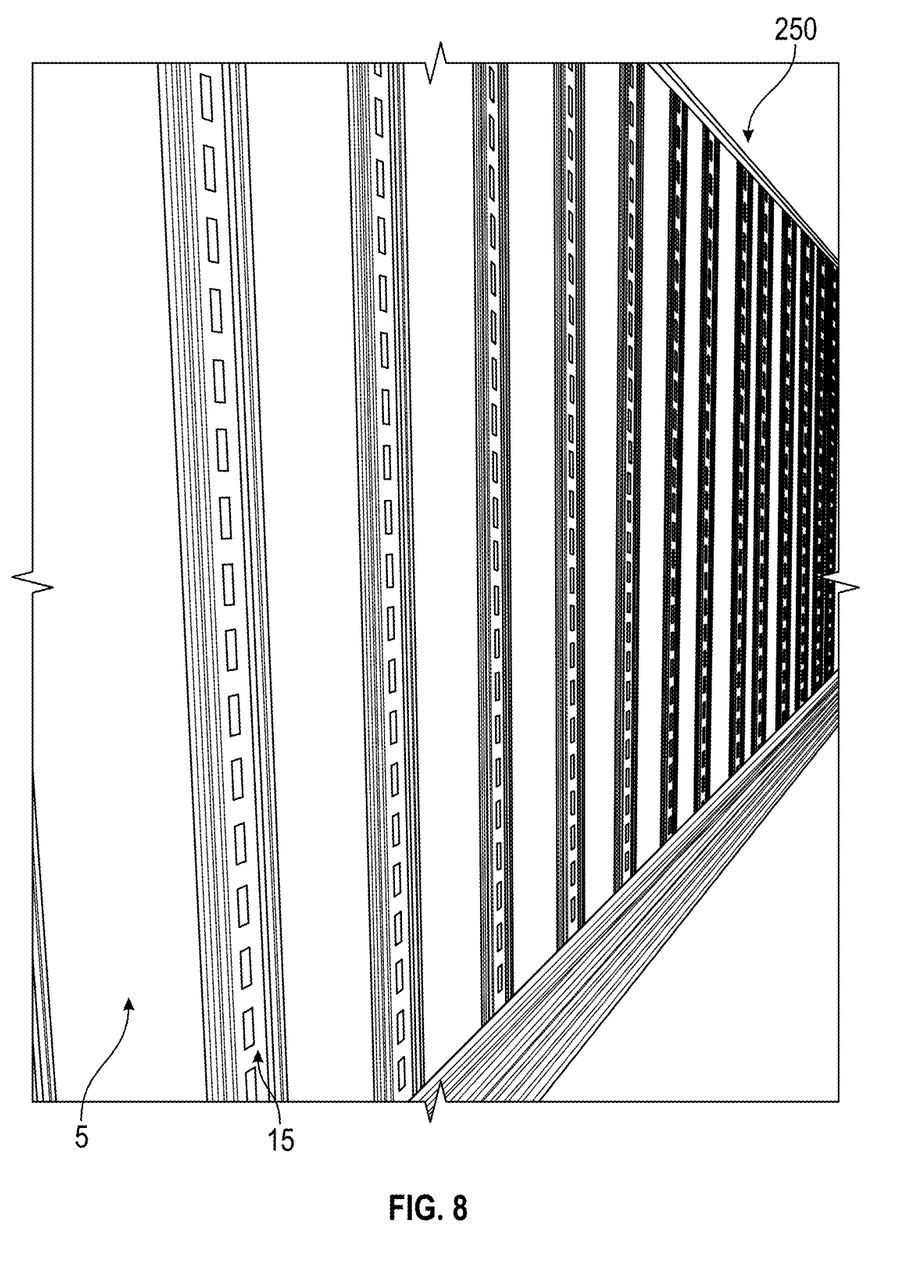
FIG. 8 is a perspective side view of a truck trailer comprising a plurality of wall panels and a plurality of beams, according to exemplary embodiments.

FIG. 8 shows an example of a truck trailer 250 comprising a plurality of wall panels 5 and a plurality of beams 15 mounted therein.

As used herein, the phrases "for example," "as an example," and/or simply the terms "example" or "exemplary," when used with reference to one or more components, features, details, structures, methods and/or figures according to the present disclosure, are intended to convey that the described component, feature, detail, structure, method and/or figure is an illustrative, non-exclusive example of components, features, details, structures, methods and/or figures according to the present disclosure. Thus, the described component, feature, detail, structure, method and/or figure is not intended to be limiting, required, or exclusive/exhaustive; and other components, features, details, structures, methods and/or figures, including structurally and/or functionally similar and/or equivalent components, features, details, structures, methods and/or figures, are also within the scope of the present disclosure. Any embodiment or aspect described herein as "exemplary" is not to be construed as preferred or advantageous over other embodiments.

The invention claimed is:

1. A shock deflecting trailer wall panel assembly comprising:
at least one wall panel having at least one edge, the at least one edge bent to form a first wall corner and a second wall corner,
a first leg between the first wall corner and the second wall corner and extending from the first wall corner in a generally inward direction towards the wall, and
a second leg extending from the second wall corner in a generally outward direction from the wall; and
at least one beam comprising:
at least one edge bent to form a first beam corner, a second beam corner and a third beam corner,
a first arm between the first beam corner and the second beam corner and extending from the first corner in a generally outward direction from the wall, an intermediate section extending from the second beam corner and the third beam corner, and
a second arm extending from the third beam corner in a generally inward direction towards the wall, wherein the first and second arms are substantially parallel to one another,
wherein the at least one edge of the at least one beam is configured to be received and retained within the at least one edge of the at least one wall panel.

2. The assembly of claim 1, wherein the second arm of the at least one beam is configured to abut the second leg of the at least one wall panel such that a shock is to be deflected away from the at least one beam while maintaining the at least one edge of the at least one beam received and retained within the at least one edge of the at least one wall panel.

3. The assembly of claim 2, wherein the shock is a force directed towards the at least one edge of the at least one beam and the deflection of the shock comprises the redirection of the force away from the at least one edge of the at least one beam.

4. The assembly of claim 3, wherein the force is redirected along the intermediate section of the at least one edge of the at least one beam.

5. The assembly of claim 3, wherein the deflection of the shock away from the at least one beam dissipates a force of the shock and preserves integrity of the at least one beam.

6. The assembly of claim 1, wherein the first wall corner of each of the at least one wall panel and the second beam corner of each of the at least one beam are to extend substantially the same distance from the wall.

7. The assembly of claim 1, wherein the second arm of the at least one beam is to be received and retained within the second wall corner of the at least one wall panel.

8. The assembly of claim 1, wherein the second arm of the at least one beam and at least a part of the intermediate portion section of the at least one beam are to be received and retained within the second wall corner of the at least one wall panel.

9. The assembly of claim 1, wherein the first beam corner defines an angle of about 95 degrees to about 115 degrees.

10. The assembly of claim 1, wherein the first beam corner defines an angle of about 100 degrees to about 110 degrees.

11. The assembly of claim 1, wherein the second beam corner defines an angle of about 70 degrees to about 90 degrees.

12. The assembly of claim 1, wherein the second beam corner defines an angle of about 75 degrees to about 85 degrees.

13. The assembly of claim 1, wherein the third beam corner defines an angle of about 90 degrees to about 110 degrees.

14. The assembly of claim 1, wherein the third beam corner defines an angle of about 95 degrees to about 105 degrees.

15. The assembly of claim 1, wherein the at least one beam further comprises at least one transitionary section.

16. The assembly of claim 1, wherein the at least one beam comprises a first and second edge.

17. The assembly of claim 15, wherein the at least one transitionary section is between the first and second edge.

18. The assembly of claim 17, wherein the at least one transitionary section is substantially flat.

19. The assembly of claim 15, wherein the at least one transitionary section comprises:
   a first flat portion bent to form a first transitionary corner,
   a first arm extending from the first transitionary corner in a generally outward direction from the wall bent to form a second transitionary corner,
   an intermediate section extending from the second transitionary corner and bent at a third transitionary corner
   a second arm extending from the third transitionary corner in a generally inward direction towards the wall and bent at a fourth transitionary corner, and
   a second flat portion extending from the fourth transitionary corner.

20. The assembly of claim 19, wherein the first arm and second arm of the transitionary section are substantially parallel.

* * * * *